US010169440B2

(12) United States Patent
Chen et al.

(10) Patent No.: US 10,169,440 B2
(45) **Date of Patent: *Jan. 1, 2019**

(54) SYNCHRONOUS DATA REPLICATION IN A CONTENT MANAGEMENT SYSTEM

(71) Applicant: International Business Machines Corporation, Armonk, NY (US)

(72) Inventors: Ning Chen, Beijing (CN); Mang-Rong Ho, San Jose, CA (US); Gerald E. Kozina, Cupertino, CA (US); Yong L. Li, Beijing (CN); Masoud Madani, Costa Mesa, CA (US); Mayank V. Shah, San Jose, CA (US); George F. Silva, Watsonville, CA (US); Alan T. Yaung, San Jose, CA (US); John T. Zientara, Franklin Lakes, NJ (US)

(73) Assignee: International Business Machines Corporation, Armonk, NY (US)

( * ) Notice: Subject to any disclaimer, the term of this patent is extended or adjusted under 35 U.S.C. 154(b) by 159 days.

This patent is subject to a terminal disclaimer.

(21) Appl. No.: 14/164,926

(22) Filed: Jan. 27, 2014

(65) Prior Publication Data

US 2015/0213102 A1 Jul. 30, 2015

(51) Int. Cl.

| | |
|---|---|
| ***G06F 7/00*** | (2006.01) |
| ***G06F 17/00*** | (2006.01) |
| ***G06F 17/30*** | (2006.01) |

(52) U.S. Cl.
CPC .............................. *G06F 17/30581* (2013.01)

(58) Field of Classification Search
None
See application file for complete search history.

(56) References Cited

U.S. PATENT DOCUMENTS

| | | | | |
|---|---|---|---|---|
| 8,504,523 | B2 * | 8/2013 | Starkey | G06F 17/30575 707/638 |
| 2003/0188035 | A1 * | 10/2003 | Lubbers | G06F 11/1666 719/310 |
| 2005/0080801 | A1 * | 4/2005 | Kothandaraman | H04L 67/06 |
| 2009/0006888 | A1 * | 1/2009 | Bernhard | G06F 11/08 714/6.12 |
| 2009/0313311 | A1 * | 12/2009 | Hoffmann | G06F 11/2094 |

(Continued)

FOREIGN PATENT DOCUMENTS

WO 2011023979 A2 3/2011

OTHER PUBLICATIONS

Harris, N. et al.; "Availability Management—Planning and Implementing Cross-Site Mirroring on IBM System i5"; IBM Corporation; http://www.ibm.com/redbooks/sg24-6661-01 . . . ; Nov. 2007. 248 pp.

(Continued)

*Primary Examiner* — Tuan A Pham
(74) *Attorney, Agent, or Firm* — Mollborn Patents, Inc.; Fredrik Mollborn

(57) ABSTRACT

Methods and apparatus, including computer program products, implementing and using techniques for data replication in a cluster. In response to identifying data to replicate in a multi-node system by a first node in a cluster, the data is written concurrently to other nodes in the cluster based on a rule set in a repository. In response to detecting a criterion described in the rule set, an action is performed.

16 Claims, 4 Drawing Sheets

(56) References Cited

U.S. PATENT DOCUMENTS

| | | | | |
|---|---|---|---|---|
| 2010/0023564 | A1* | 1/2010 | Yerneni | G06F 11/1662 707/E17.007 |
| 2011/0106774 | A1 | 5/2011 | Wickremesinghe et al. | |
| 2011/0191300 | A1 | 8/2011 | Orenstein et al. | |
| 2011/0320400 | A1* | 12/2011 | Namini | G06F 17/30327 707/610 |
| 2012/0254342 | A1* | 10/2012 | Evans | G06F 11/186 709/214 |
| 2013/0054518 | A1* | 2/2013 | Anglin | G06F 17/30575 707/610 |
| 2013/0110778 | A1* | 5/2013 | Taylor | G06F 17/30215 707/624 |
| 2013/0151467 | A1 | 6/2013 | Krishnan et al. | |
| 2013/0201821 | A1* | 8/2013 | Yamato | H04L 41/0893 370/225 |

OTHER PUBLICATIONS

Schmidt-Dannert, R.; "SAP R/3 and DB2 UDB in a Microsoft Cluster Server Environment"; IBM Corporation; http://ww.ibm.com/rebooks/redp00-1400 . . . Jul. 1999. 84 pp.

Vieiera, D. et al.; "A Content-oriented Web Cache under P2P Video Distribution Systems"; IEEE Latin America Transactions, vol. 8, No. 4, pp. 349-357; Aug. 2010. pp. 349-357.

USPTO Office Action. U.S. Appl. No. 14/526,139, dated Sep. 6, 2017.

USPTO Office Action. U.S. Appl. No. 14/526,139, dated Mar. 15, 2018.

* cited by examiner

SYNCHRONOUS DATA REPLICATION IN A CONTENT MANAGEMENT SYSTEM

BACKGROUND

The present invention relates to Content Management Systems, and more specifically, to data replication in Content Management Systems. Synchronous data replication is an important feature in a Content Management System (CMS). Current CMSs typically implement synchronous data replication in one of two ways: a so-called "pipeline write" and a so-called "n-way synchronous write." The pipeline write approach includes writing the data in data nodes, one after another. The n-way write includes writing data in all data nodes synchronously.

For example, in the pipeline write mode, when user writes data into a system that has a replica factor set to three, the data is first written into the first data node. After that, the first data node can start replicating the arrived piece of data into a second data node even if the data has not been entirely persisted in the first data node. The second data node can then do the same to copy data to the third data node. The user receives a success confirmation of the data writing when all data is persisted in all three data nodes. The n-way write mode, on the other hand, behaves differently. In the n-way write mode, using the same replica factor, the data is written into the three data nodes synchronously, and the write operation succeeds when the data is accepted by all of the three data nodes.

However, both the pipeline write mode and the n-way write mode have their own associated problems. For example, in the pipeline write method, the latency grows rapidly when the replica factor increases, whereas for n-way write method, the network bandwidth at the client side is heavily occupied by the write application and the write application keeps occupying more and more bandwidth with each increment of the replica factor. Thus, different approaches are needed to address these and other issues associated with synchronous data replication in CMSs.

SUMMARY

According to one aspect of the present invention, methods and apparatus, including computer program products, are provided for data replication in a cluster. In response to identifying data to replicate in a multi-node system by a first node in a cluster, the data is written concurrently to other nodes in the cluster based on a rule set in a repository. In response to detecting a criterion described in the rule set, an action is performed.

The details of one or more embodiments of the invention are set forth in the accompanying drawings and the description below. Other features and advantages of the invention will be apparent from the description and drawings, and from the claims.

BRIEF DESCRIPTION OF THE SEVERAL VIEWS OF THE DRAWINGS

Like reference symbols in the various drawings indicate like elements.

DETAILED DESCRIPTION

Figure 1:
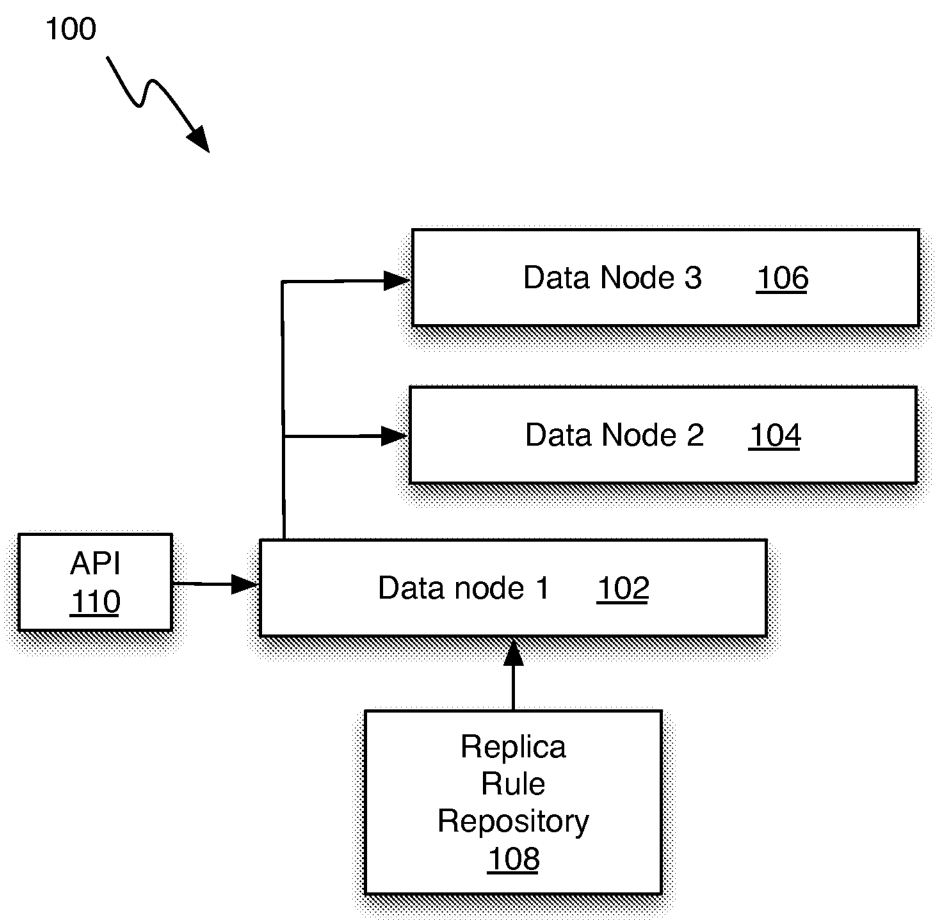
FIG. 1 shows a schematic view of a replication configuration, in accordance with one embodiment.

The various embodiments of this invention provide techniques that allow a user to write data in the first node. The first node then writes the data into the rest of replica data nodes synchronously and the user receives a success confirmation from the first data node once the data is persisted in all the replica data nodes. The various embodiments of this invention can benefit a user who needs low latency, while also being sensitive to network bandwidth issues. One example of such a user can be a transactional content ingestion system, which requires both low latency and low network bandwidth occupation.

During the data ingestion, there also needs to be mechanisms for achieving data consistency and system availability, even when some of data nodes are not available. In order to address this need, various embodiments of the invention provide strict and tolerant replication modes, respectively. The strict mode requires data ingestion success in all data nodes, and is applied in situations that require strict data consistency and no data losses. The tolerant mode, on the other hand, allows just a quorum number of success, and is applied in situations that require high throughput and high availability in data ingestion. In the tolerant mode, asynchronous replication tasks are created for each data node that failed during data ingestion. These asynchronous tasks are created in one of data nodes that succeeded during data ingestion, and this data node runs the replication tasks and recovers the data to the failed nodes.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows a schematic view of a replication configuration (100), in accordance with one embodiment. As can be seen in FIG. 1, there are three replication nodes (102, 104, 106) defined for each data node in the CMS. The data stored in a data node will be replicated to its three replication nodes synchronously.

A replica rule repository (108) contains replication rules for data persistence. In one embodiment, each replication rule for a data node includes the replica factor, replication failover mode (i.e., either strict mode, or tolerant mode), and the replica data node connection information.

When the Application Program Interface (API) (110) stores content into a data node, the data is persisted by block. When the first block is persisted by the data node, the data node retrieves the replication rules from the replica rule repository (108), and starts to transfer data blocks, which have already persisted, to its replication data nodes (102, 104, 106) synchronously.

Figure 2:
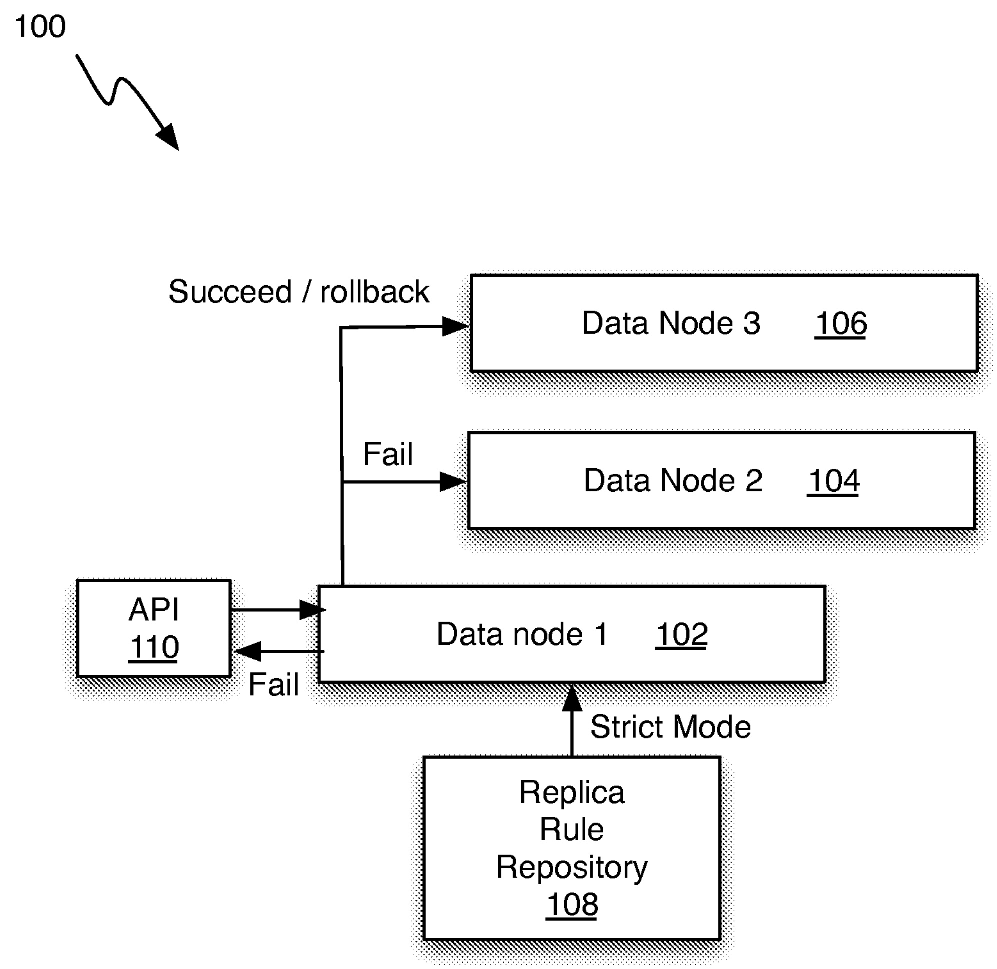
FIG. 2 shows a schematic illustration of how data is persisted in a strict mode, in accordance with one embodiment.

FIG. 2 shows a schematic illustration of how data is persisted in the strict mode, in accordance with one embodiment of the invention. As was described above, the strict mode requires that data be persisted to the data node and all its replica nodes before the data node returns success to user. If any one of the replica data nodes fails to persist, the original data node stops the data transfer to other data nodes, and issues a command to tell the succeeded data nodes to rollback the operation. As can be seen in FIG. 2, the API (110) sends a store request to Data Node 1 (102). Data Node 1 (102) retrieves the replication rule and failover mode from the replica rule repository (108). Data Node 1 (102) receives the data to be replicated from the API (110) and replicates the data to Data Node 2 (104) and Data Node 3 (106) synchronously.

Now, assume that there is a failure in the replication of the data to Data Node 2 (104). Then, Data Node 1 (102) would request Data Node 3 (106) to roll back. Data Node 1 (102) then fails the whole process and returns a "Failure" message to the API (110).

Figure 3:
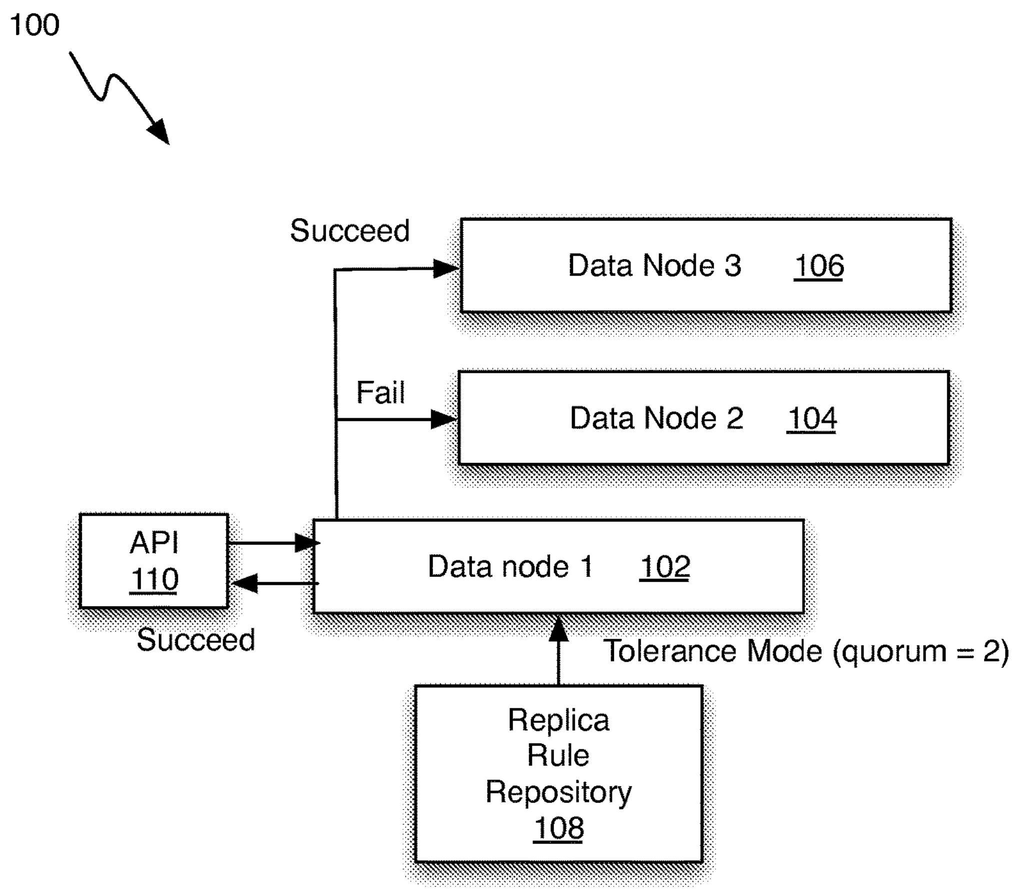
FIG. 3 shows a schematic illustration of how data is persisted in a tolerant mode, in accordance with one embodiment.

FIG. 3 shows a schematic illustration of how data is persisted in the tolerant mode, in accordance with one embodiment of the invention. As was described above, the tolerant mode allows the user to assign a quorum, and only if the quorum is met, the data replication is recognized as success by the data node or one of its replica nodes. When the data node is off, one of its replica nodes will take over the storing operation and replicate the data to other live data replication nodes. The node that receives the store request from client will build the asynchronous replication tasks to replicate the data to the other replication nodes that are not available to complete the store operation for the time being.

As can be seen in FIG. 3, the API (110) sends a store request to Data Node 1 (102). Data Node 1 (102) retrieves the replication rule and failover mode from the replica rule repository (108). In this case, the "tolerant" mode is selected and a quorum number of two is required. Data Node 1 (102) receives the data to be replicated from the API (110) and replicates the data to Data Node 2 (104) and Data Node 3 (106) synchronously.

Now, assume, just like in the above example, that there is a failure in the replication of the data to Data Node 2 (104). Then, Data Node 1 (102) would create a replication task in itself and try to execute this replication task at a later point in time to replicate the data asynchronously to Data Node 2 (104). Since only a quorum of two is required and the data has been successfully replicated to Data Node 1 (102) and Data Node 3 (106), a "success" message is returned by Data node 1 (102) to the API (110).

Figure 4:
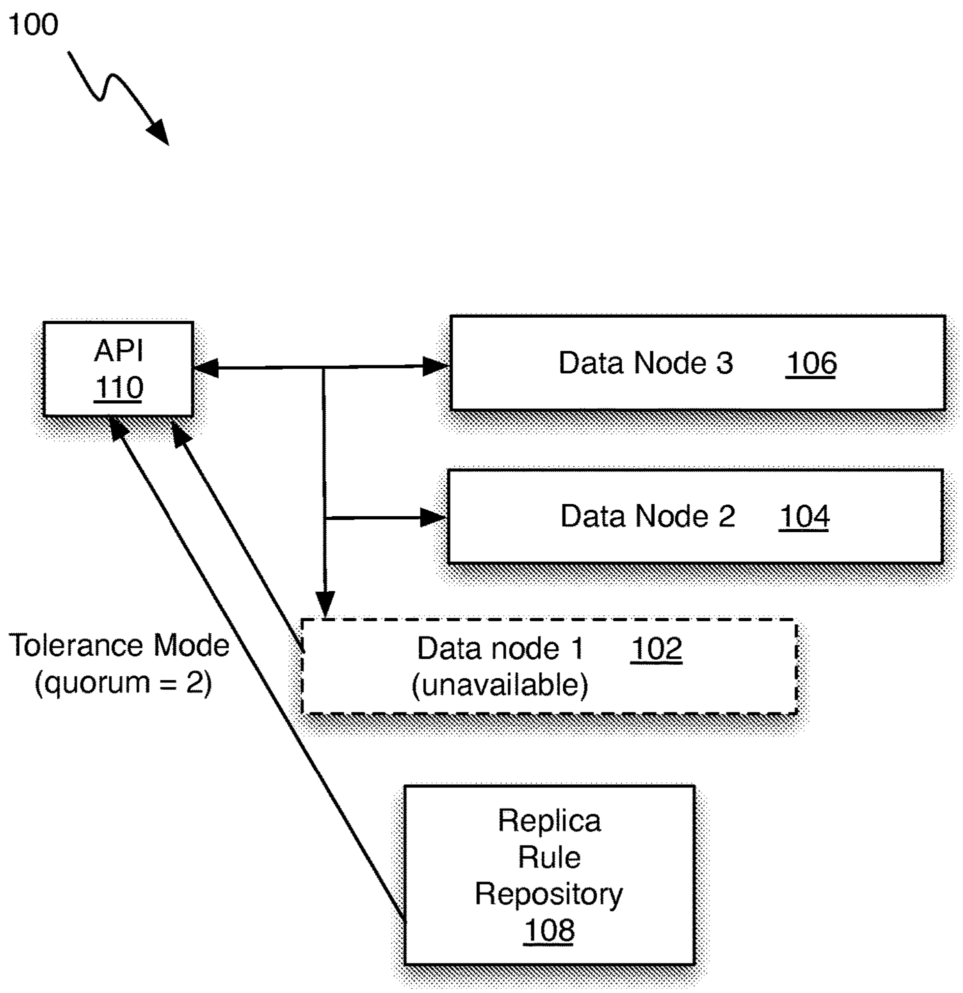
FIG. 4 shows a schematic illustration of how data is persisted in a tolerant mode, in accordance with another embodiment.

FIG. 4 shows a schematic illustration of how data is persisted in the tolerant mode, in accordance with a different embodiment of the invention. As can be seen in FIG. 4, the API (110) tries to send a store request to Data Node 1 (102), but finds that Data Node 1 (102) is unavailable. API (110) therefore retrieves the replication rule and failover mode for Data Node 1 (102) from the replica rule repository (108). Also here, the "tolerant" mode is selected and a quorum number of two is required. Data Node 3 (106), which is functioning properly, is instead chosen by the API (110) and receives the data to be replicated. Data Node 3 (106) creates a replication task in itself and will try to execute this replication task at a later point in time to replicate the data asynchronously to Data Node 1 (102). Data Node 3 (106) replicates the data to Data Node 2 (104). Again, since only a quorum of two is required and the data has been successfully replicated to Data Node 3 (106) and Data Node 2 (104), a "success" message is returned by Data node 3 (106) to the API (110).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer program product for data replication during ingestion of data in a content management system, the computer program product comprising a non-transitory computer readable storage medium having program code embodied therewith, the program code being executable by a processor to:

- receive, by the processor and in response to instructions by an application programming interface, blocks of data to be written into a content management system;
- retrieve a replication rule from a replication rule repository, wherein the replication rule includes instructions for handling the blocks of data in a strict mode and in a tolerant mode, respectively;
- replicate the blocks of data to different live replication nodes in the content management system using the strict mode in situations that require strict data consistency and no data losses in response to writing the blocks of data to the first node in the content management system by the processor and in response to instructions by the application programming interface, wherein the strict mode requires that the blocks of data be persisted synchronously to the first node and all its replica nodes before the data node returns a success status;
- replicate the blocks of data to different live replication nodes in the content management system using the tolerant mode in situations that require high throughput and high availability in data ingestion, in response to writing the blocks of data to the first node in the content management system by the processor and in response to instructions by the application programming interface, wherein the tolerant mode requires that the blocks of data be persisted synchronously to a user-assigned number of replica nodes of the first data node before the first data node returns a success status and the data blocks be asynchronously persisted to any failed data nodes at a later point in time; and
- receive either a success status or a failure status for persisting the data in the content management system.

2. The computer program product of claim 1, further comprising program code executable by the processor to:

- receive a status back from each replication node.

3. The computer program product of claim 2, further comprising program code executable by the processor to:

- determine, from the received statuses, whether to rollback the replication of data from the replication nodes.

4. The computer program product of claim 3, wherein in the strict mode the determining includes:

- determining to rollback the replication data in response to receiving a status indicating failure to persist the data from at least one of the replication nodes.

5. The computer program product of claim 3, wherein in the tolerant mode the determining includes:

- determining to rollback the replication data in response to receiving a status indicating failure to persist the data from a number of nodes that exceeds a predetermined quorum of nodes.

6. The computer program product of claim 3, further comprising program code executable by the processor to:

- in response to determining that the replication data should not be rolled back in the tolerant mode, replicate the data to one or more responding replication nodes; and replicate the data from the responding replication nodes to failed replication nodes asynchronously at a later point in time.

7. The computer program product of claim 1, further comprising program code executable by the processor to:

provide an application programming interface for replicating data.

8. The computer program product of claim 1, further comprising program code executable by the processor to:

return one of a success message and a fail message for the data replication to a user.

9. A system for data replication during ingestion of data in a content management system, comprising:

a processor; and a memory storing instructions that when executed by the processor, cause the processor to:

receive, by the processor and in response to instructions by an application programming interface, blocks of data to be written into a content management system;

retrieve a replication rule from a replication rule repository, wherein the replication rule includes instructions for handling the blocks of data in a strict mode and in a tolerant mode, respectively;

replicate the blocks of data to different live replication nodes in the content management system using the strict mode in situations that require strict data consistency and no data losses in response to writing the blocks of data to the first node in the content management system by the processor and in response to instructions by the application programming interface, wherein the strict mode requires that the blocks of data be persisted synchronously to the first node and all its replica nodes before the data node returns a success status;

replicate the blocks of data to different live replication nodes in the content management system using the tolerant mode in situations that require high throughput and high availability in data ingestion, in response to writing the blocks of data to the first node in the content management system by the processor and in response to instructions by the application programming interface, wherein the tolerant mode requires that the blocks of data be persisted synchronously to a user-assigned number of replica nodes of the first data node before the first data node returns a success status and the data blocks be asynchronously persisted to any failed data nodes at a later point in time; and receive either a success status or a failure status for persisting the data in the content management system.

10. The system of claim 9, wherein the memory further stores instructions that when executed by the processor cause the processor to:

receive a status back from each replication node.

11. The system of claim 10, wherein the memory further stores instructions that when executed by the processor cause the processor to:

determine, from the received statuses, whether to rollback the replication of data from the replication nodes.

12. The system of claim 11, wherein in the strict mode the determining includes:

determining to rollback the replication data in response to receiving a status indicating failure to persist the data from at least one of the replication nodes.

13. The system of claim 11, wherein in the tolerant mode the determining includes:

determining to rollback the replication data in response to receiving a status indicating failure to persist the data from a number of nodes that exceeds a predetermined quorum of nodes.

14. The system of claim 11, wherein the memory further stores instructions that when executed by the processor cause the processor to:

in response to determining that the replication data should not be rolled back in the tolerant mode, replicate the data to one or more responding replication nodes; and replicate the data from the responding replication nodes to failed replication nodes asynchronously at a later point in time.

15. The system of claim 9, wherein the memory further stores instructions that when executed by the processor cause the processor to:

provide an application programming interface for replicating data.

16. The system of claim 9, wherein the memory further stores instructions that when executed by the processor cause the processor to:

return one of a success message and a fail message for the data replication to a user.

* * * * *